US012681833B2

(12) United States Patent
Mokkapati et al.

(10) Patent No.: US 12,681,833 B2
(45) Date of Patent: Jul. 14, 2026

(54) SYSTEM SIMULATION AND ABNORMALITY DETECTION

(71) Applicant: Bank of America Corporation, Charlotte, NC (US)

(72) Inventors: Silpa Mokkapati, Lawrenceville, NJ (US); Yogi Ahuja, Warwick, PA (US); Subhashish Panda, Plainsboro, NJ (US); Tirtha Pandya, Franklin Park, NJ (US); Jeonghoon Lee, East Brunswick, NJ (US); Roman Zhitnitskiy, Langhorne, PA (US)

(73) Assignee: Bank of America Corporation, Charlotte, NC (US)

( * ) Notice: Subject to any disclaimer, the term of this patent is extended or adjusted under 35 U.S.C. 154(b) by 212 days.

(21) Appl. No.: 18/403,154

(22) Filed: Jan. 3, 2024

(65) Prior Publication Data

US 2025/0217263 A1     Jul. 3, 2025

(51) Int. Cl.
G06F 11/3604 (2025.01)

(52) U.S. Cl.
CPC ................................. G06F 11/3604 (2013.01)

(58) Field of Classification Search
CPC ....................................................... G06F 11/36
See application file for complete search history.

(56) References Cited

U.S. PATENT DOCUMENTS

| 5,425,036 | A | 6/1995 | Liu et al. |
| 7,567,894 | B2 | 7/2009 | Durand et al. |

| 8,489,925 | B1 * | 7/2013 | Antukh ............... G06F 11/3698 |
| | | | 714/28 |
| 8,645,118 | B2 | 2/2014 | Durand et al. |
| 9,473,522 | B1 * | 10/2016 | Kotler ................. H04L 63/1433 |
| 11,726,902 | B1 * | 8/2023 | Ganesan ............. G06F 11/0772 |
| | | | 717/124 |
| 12,222,842 | B2 * | 2/2025 | Hotra .................. G06F 11/3668 |
| 2013/0004087 | A1 * | 1/2013 | Kumar ................. G06V 10/751 |
| | | | 382/218 |
| 2020/0004963 | A1 * | 1/2020 | Zheng ..................... G06F 21/53 |
| 2021/0149783 | A1 * | 5/2021 | Gudka ................ G06F 11/0793 |

(Continued)

FOREIGN PATENT DOCUMENTS

| EP | 4010806 A1 | 6/2022 |

*Primary Examiner* — Duy Khuong T Nguyen
(74) *Attorney, Agent, or Firm* — Banner & Witcoff, Ltd.

(57) ABSTRACT

Arrangements for simulation generation and abnormality detection are provided. In some examples, a computing platform may identify a plurality of applications for analysis. The computing platform may execute a plurality of simulated scenarios for each application and, based on execution of the simulated scenarios, the computing platform may capture abnormality results for each application. The abnormality results, as well as application information and/or simulated scenarios may be stored. In some examples, the computing platform may compare deployed versions of each application to the captured abnormality data to identify an abnormality in a deployed version of an application. Based on the identified abnormality, the computing platform may evaluate the identified abnormality to determine whether it can be resolved automatically. If so, the computing platform may execute one or more commands modifying the deployed application to resolve the abnormality.

20 Claims, 9 Drawing Sheets

(56)          References Cited

U.S. PATENT DOCUMENTS

2023/0236944 A1*   7/2023   Hussain ................. G06N 20/00
                                                  714/57
2025/0077374 A1*   3/2025   Baker ................... G06F 11/263

* cited by examiner

SYSTEM SIMULATION AND ABNORMALITY DETECTION

BACKGROUND

Aspects of the disclosure relate to electrical computers, systems, and devices for system simulation and abnormality detection.

Large enterprise organizations often have multiple distributed systems obtaining data from various sources. Some more modern sources or systems may have the ability to triage issues or abnormalities but some of the legacy applications might not have that capability. Accordingly, it may be difficult to identify abnormalities, understand the impact of abnormalities on not only the system or application with the abnormality but also upstream and/or downstream applications and systems, and quickly identify and implement resolutions. Accordingly, aspects described herein are directed to using system simulation to identify and resolve abnormalities in applications and systems.

SUMMARY

The following presents a simplified summary in order to provide a basic understanding of some aspects of the disclosure. The summary is not an extensive overview of the disclosure. It is neither intended to identify key or critical elements of the disclosure nor to delineate the scope of the disclosure. The following summary merely presents some concepts of the disclosure in a simplified form as a prelude to the description below.

Aspects of the disclosure provide effective, efficient, scalable, and convenient technical solutions that address and overcome the technical issues associated with detecting and resolving abnormalities in applications or systems.

In some examples, a computing platform may identify a plurality of applications for analysis. For instance, the computing platform may identify a plurality of applications for simulation generation and abnormality detection. In some examples, the computing platform may execute a plurality of simulated scenarios for each application of the plurality of applications identified for analysis. In some arrangements, the simulated scenarios may include simulated communications between applications.

Based on execution of the simulated scenarios, the computing platform may capture abnormality results for each application. The abnormality results, as well as application information and/or simulated scenarios may be stored.

In some examples, the computing platform may compare deployed versions of each application to the simulated scenarios and captured abnormality data to identify an abnormality in a deployed version of an application. Based on the identified abnormality, the computing platform may evaluate the identified abnormality to determine whether it can be resolved automatically. If so, the computing platform may execute one or more commands modifying the deployed application to resolve the abnormality. If not, a notification may be generated and transmitted to a computing device, such as an administrator computing device.

These features, along with many others, are discussed in greater detail below.

BRIEF DESCRIPTION OF THE DRAWINGS

The present disclosure is illustrated by way of example and not limited in the accompanying figures in which like reference numerals indicate similar elements and in which.

DETAILED DESCRIPTION

In the following description of various illustrative embodiments, reference is made to the accompanying drawings, which form a part hereof, and in which is shown, by way of illustration, various embodiments in which aspects of the disclosure may be practiced. It is to be understood that other embodiments may be utilized, and structural and functional modifications may be made, without departing from the scope of the present disclosure.

It is noted that various connections between elements are discussed in the following description. It is noted that these connections are general and, unless specified otherwise, may be direct or indirect, wired or wireless, and that the specification is not intended to be limiting in this respect.

As discussed herein, large distributed systems may rely on data from various sources that may include modern sources that can be triaged, as well as legacy sources that might not provide sufficient indicators to triage an issue or abnormality. For instance, in some examples, distributed systems may have a large number of applications that are disconnected or hard to triage when an issue arises, particularly when issues cannot be tracked using correlation identifiers. Accordingly, arrangements described provide for use of simulation of systems and applications to identify abnormalities in deployed applications and, in some examples, automatically resolve the abnormality.

For instance, a plurality of simulation scenarios for a plurality of applications may be generated and executed. In some examples, executing the simulated scenarios may include injecting errors into a system or application and observing the impact of the error on the instant application, as well as other connected applications (e.g., upstream or downstream applications). If any abnormalities are detected, the abnormalities may be stored and analyzed, using machine learning, to identify or predict abnormalities in deployed applications. If an abnormality is identified in a deployed application, the system may determine whether the abnormality can be resolved automatically and, if so, one or more commands may be executed to resolve the abnormality.

These and various other arrangements will be discussed more fully below.

Figure 1A:
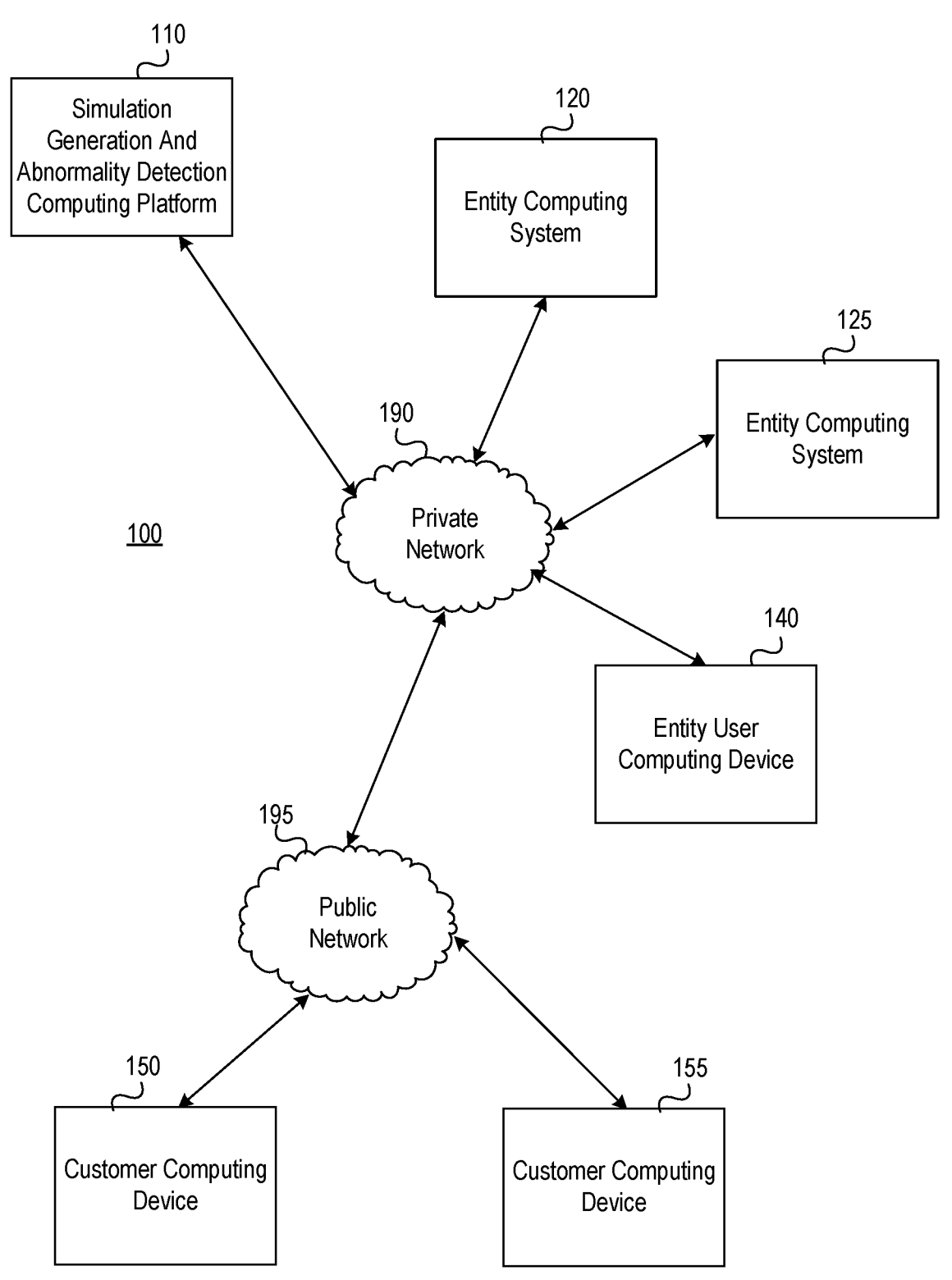
FIGS. 1A-1B depict an illustrative computing environment for simulation generation and abnormality detection in accordance with one or more aspects described herein.
Figure 1B:
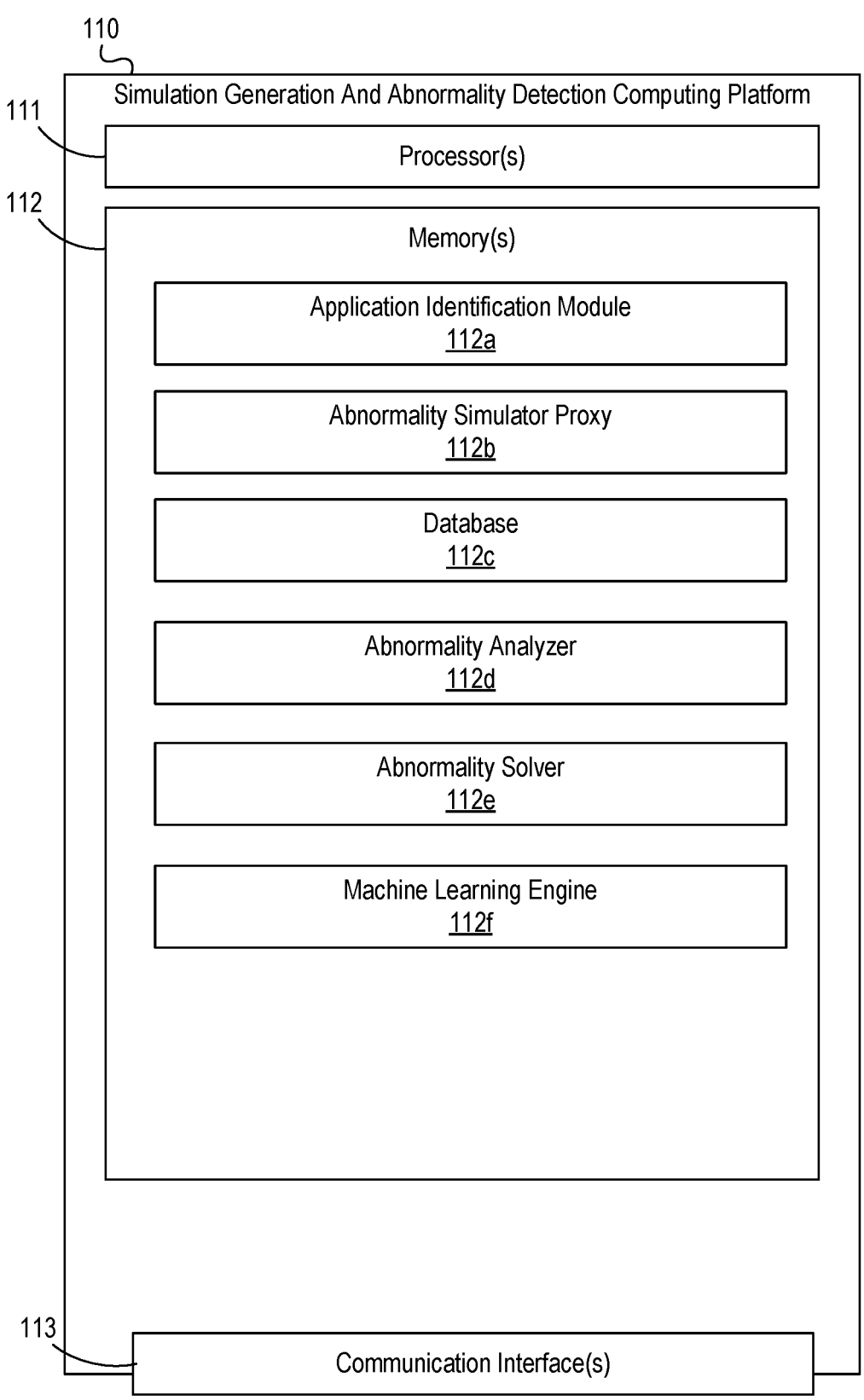

FIGS. 1A-1B depict an illustrative computing environment for implementing simulation generation and abnormality detection functions in accordance with one or more aspects described herein. Referring to FIG. 1A, computing environment 100 may include one or more computing devices and/or other computing systems. For example, computing environment 100 may include simulation generation and abnormality detection computing platform 110, entity computing system 120, entity computing system 125, entity user computing device 140, customer computing device 150 and/or customer computing device 155. Although two entity computing systems 120, 125, one entity user computing device 140, and two customer computing devices 150, 155 are shown, any number of systems or devices may be used without departing from the invention.

Simulation generation and abnormality detection computing platform 110 may be or include one or more computing devices (e.g., servers, server blades, or the like) and/or one or more computing components (e.g., memory, processor, and the like) and may be configured to provide dynamic, efficient, intelligent simulation generation and abnormality detection for one or more applications, systems or the like. For instance, simulation generation and abnormality detection computing platform 110 may identify a plurality of applications (e.g., applications hosted by and/or executing on enterprise organization computing systems, such as entity computing system 120 and/or entity computing system 125). Simulation generation and abnormality detection computing platform 110 may generate a plurality of simulations or simulated scenarios to detect abnormalities that may occur in an application or systems and/or in one or more upstream or downstream applications or systems. For instance, simulation generation and abnormality detection computing platform 110 may test communications between various applications, systems, or the like, to see whether any abnormalities occur (e.g., improperly displayed information, incorrect information, pages are slow to load, or the like) and may store the detected abnormality. In some examples, simulation generation and abnormality detection computing platform 110 may "practice" solving any identified abnormalities in the simulated environment (e.g., test various abnormality resolutions on the simulation generated abnormality). This information may also be stored by the simulation generation and abnormality detection computing platform 110.

In some examples, deployed applications and/or systems may be analyzed to determine whether any of the abnormalities detected in the simulated scenarios are detected in the deployed applications or systems. If so, the simulation generation and abnormality detection computing platform 110 may attempt to resolve the abnormality (e.g., using a stored resolution generated during the simulation). If the abnormality cannot be resolved automatically, the simulation generation and abnormality detection computing platform 110 may generate and transmit a notification to a computing device, such as entity user computing device 140, indicating that an abnormality has been detected.

Entity computing system 120 and/or entity computing system 125 may be or include one or more computing devices (e.g., servers, server blades, or the like) and/or one or more computing components (e.g., memory, processor, and the like) and may be configured to host or executed one or more enterprise organization applications. For instance, entity computing system 120 and/or entity computing system 125 may host or execute internal or customer-facing applications or systems that may be accessed by one or more users via a network, such as t a private network 190, public network 195, or the like. In some examples, the applications or systems hosted or executed by entity computing system 120 and/or entity computing system 125 may include one or more user interfaces displaying data (e.g., text, image, video, or the like) including user selectable options, providing information retrieved via one or more application programming interfaces, or the like.

Entity user computing device 140 may be or include a computing device such as a desktop computer, laptop computer, tablet, smartphone, wearable device, and the like, that is associated with a user (e.g., an employee) of the enterprise organization. Entity user computing device 140 may communicate with simulation generation and abnormality detection computing platform 110 to receive and display notifications related to detected abnormalities, control parameters of simulated scenarios, and the like. Entity user computing device 140 may also be configured to access one or more enterprise systems or applications hosted by entity computing system 120 and/or entity computing system 125.

Customer computing device 150 and/or customer computing device 155 may be or include computing device such as a desktop computer, laptop computer, tablet, smartphone, wearable device, and the like, to access one or more enterprise applications or systems hosted by or executed on entity computing system 120 and/or entity computing system 125. Customer computing device 150 and/or customer computing device 154 may be configured to display one or more user interfaces associated with the applications or systems, receive user input making one or more selections from the user interfaces, and the like.

As mentioned above, computing environment 100 also may include one or more networks, which may interconnect one or more of simulation generation and abnormality detection computing platform 110, entity computing system 120, entity computing system 125, entity user computing device 140, customer computing device 150 and/or customer computing device 155. For example, computing environment 100 may include private network 190 and public network 195. Private network 190 and/or public network 195 may include one or more sub-networks (e.g., Local Area Networks (LANs), Wide Area Networks (WANs), or the like). Private network 190 may be associated with a particular organization (e.g., a corporation, financial institution, educational institution, governmental institution, or the like) and may interconnect one or more computing devices associated with the organization. For example, simulation generation and abnormality detection computing platform 110, entity computing system 120, entity computing system 125, and/or entity user computing device 140, may be associated with an enterprise organization (e.g., a financial institution), and private network 190 may be associated with and/or operated by the organization, and may include one or more networks (e.g., LANs, WANs, virtual private networks (VPNs), or the like) that interconnect simulation generation and abnormality detection computing platform 110, entity computing system 120, entity computing system 125, and/or entity user computing device 140, and one or more other computing devices and/or computer systems that are used by, operated by, and/or otherwise associated with the organization. Public network 195 may connect private network 190 and/or one or more computing devices connected thereto (e.g., simulation generation and abnormality detection computing platform 110, entity computing system 120, entity computing system 125, and/or entity user computing device 140) with one or more networks and/or computing devices that are not associated with the organization. For example, customer computing device 150 and/or customer computing device 155 might not be associated with an organization that operates private network 190 (e.g., because customer computing device 150 and/or customer computing device 155 may be owned, operated, and/or serviced by one or more entities different from the organization that operates private network 190, one or more customers of the organization, one or more employees of the organization, public or government entities, and/or vendors of the organization, rather than being owned and/or operated by the organization itself), and public network 195 may include one or more networks (e.g., the internet) that connect customer computing device 150 and/or customer computing device 155 to private network 190 and/or one or more computing devices connected thereto (e.g., simulation generation and abnormality detection computing platform 110, entity computing system 120, entity computing system 125, and/or entity user computing device 140).

Referring to FIG. 1B, simulation generation and abnormality detection computing platform 110 may include one or more processors 111, memory 112, and communication interface 113. A data bus may interconnect processor(s) 111, memory 112, and communication interface 113. Communication interface 113 may be a network interface configured to support communication between simulation generation and abnormality detection computing platform 110 and one or more networks (e.g., network 190, network 195, or the like). Memory 112 may include one or more program modules having instructions that when executed by processor(s) 111 cause simulation generation and abnormality detection computing platform 110 to perform one or more functions described herein and/or one or more databases that may store and/or otherwise maintain information which may be used by such program modules and/or processor(s) 111. In some instances, the one or more program modules and/or databases may be stored by and/or maintained in different memory units of simulation generation and abnormality detection computing platform 110 and/or by different computing devices that may form and/or otherwise make up simulation generation and abnormality detection computing platform 110.

For example, memory 112 may have, store and/or include application identification module 112a. Application identification module 112a may include instructions and/or data that may cause or enable the simulation generation and abnormality detection computing platform 110 to identify one or more systems or applications hosted by or executing on enterprise organizations computing systems, such as entity computing system 120 and/or entity computing system 125. In some examples, applications or systems may be identified for simulation and abnormality detection based on one or more properties of the application (e.g., frequency of user, number of users impacted by potential abnormality, or the like). Additionally or alternatively, all systems and applications may be evaluated for abnormalities using the arrangements described herein.

Simulation generation and abnormality detection computing platform 110 may further have, store and/or include abnormality simulator proxy 112b. Abnormality simulator proxy 112b may store instructions and/or data that may cause or enable the simulation generation and abnormality detection computing platform 110 to simulate one or more communications, interactions, or the like between applications or systems (e.g., requests for data, navigation requests, display of data, or the like). For instance, the abnormality simulator proxy 112b may act as a "pretend" environment where different abnormality situations can be created, detected and/or tested. For instance, the abnormality simulator proxy 112b may mimic behavior of applications or systems communicating with each other while introducing simulated abnormalities to see how the system reacts. In some examples, the abnormality simulator proxy 112b may intercept communication between applications and introduce abnormalities for testing and/or generating machine learning model training data. In some examples, the simulations or simulated scenarios may be based on the abnormality simulator proxy 112b injecting an error into a simulated application, system, or the like, and observe or identify impacts of the injected error (e.g., on the application, on upstream and/or downstream applications, or the like). The simulations may be performed in a secure environment so as not to impact the applications or systems that have been deployed in a production environment and are being accessed by users (e.g., internal users, customers, or the like).

In some examples, the simulations may include simulated scenarios associated with each potential option (e.g., each selectable option on a user interface, each request for data or type of data request, or the like) for each user interface within the application or system. The abnormality simulator proxy 112b may then execute the generated simulations or simulated scenarios to test each application or system to detect any abnormalities (e.g., inaccurate display of data, distorted data, delays in loading images or data, or the like). The output of each simulation or simulated scenario, including identified or detected abnormalities, may be stored in a database, such as database 112c.

In some examples, abnormality simulator proxy 112b may store further instructions and/or data that may cause or enable the simulation generation and abnormality detection computing platform 110 to attempt to resolve any detected abnormalities (e.g., in conjunction with abnormality solver 112e). For instance, abnormality simulator proxy 112b may automatically execute one or more instructions or commands to attempt to automatically resolve any detected abnormalities. For instance, if a customer font on a user interface is not displaying correctly, that may be detected as an abnormality in the simulated scenario. The abnormality simulator proxy 112b may then install or replace the customized font that was not displaying correctly with other font(s) until the data is displayed corrected (e.g., a trial and error attempt to resolve the issue). The font that displays correctly may be identified and stored in the database 112c as a resolution and, if a similar abnormality is detected in a deployed version of the user interface or application, the simulation generation and abnormality detection computing platform 110 may automatically replace the font with the font stored in the database 112c that displays correctly to resolve the issue.

In some examples, the abnormality simulator proxy 112b may identify where an abnormality first occurred and details associated with a related request. This may aid in identifying a cause of the abnormality. For instance, the details associated with the request and other data may be used to test the application to determine whether the abnormality exists in the deployed version of the application.

Simulation generation and abnormality detection computing platform 110 may further have, store and/or include abnormality analyzer 112d. Abnormality analyzer 112d may store instructions and/or data that may cause or enable the simulation generation and abnormality detection computing platform 110 to analyze deployed applications or systems using the store simulations outputs and detected abnormalities to determine what applications are impacted by an abnormality, how they are impacted and/or whether the abnormalities detected in the simulations exist in the deployed or production applications or systems. In some examples, abnormality analyzer 112d may analyze all errors from different applications stored in the database 112c to determine how one or more applications are impacted.

In some examples, the abnormality analyzer 112d may use machine learning or artificial intelligence (e.g., via machine learning engine 112*f*) to identify patterns or similarities in abnormalities to determine a cause of the abnormality. These patterns may then be used to predict abnormalities in a deployed application. In some examples, a machine learning model may be trained using, for instance, abnormality and application data from the simulated scenarios of the abnormality simulator proxy 112*b*. As additional simulated scenarios are generated and executed, additional training data may be generated and used to update, validate, re-train, or the like, the machine learning model. Accordingly, the abnormality analyzer 112*d* may detect or predict abnormalities in a deployed application, as well as other applications that might be impacted (e.g., upstream and/or downstream applications).

For instance, while it might not be possible (e.g., given resource constraints) to constantly monitor every interaction between deployed applications, the abnormality analyzer 112*d* may rely on patterns of abnormalities to predict issues and impacted applications. In one example, if a certificate issue led to a blank page in Application A but not a system failure, the abnormality analyzer 112*d* (e.g., via the machine learning engine) may predict a likelihood that the abnormality happened in a particular application and may identify other applications that may be impacted.

If abnormalities are identified in deployed applications, the simulation generation and abnormality detection computing platform 110 may attempt to resolve the abnormality using the abnormality solver 112*e*. In some examples, machine learning may be used to analyze the deployed applications to systems to identify any abnormalities. For instance, machine learning engine 112*f* may execute a machine learning model configured to receive, as inputs, identified abnormalities (e.g., from the simulations and stored in the database 112*c*), as well as the deployed applications or systems, parameters of the deployed applications or systems or the like. Execution of the model may then output one or more abnormalities detected in the deployed applications or systems. In some examples, the machine learning model may be trained using historical abnormality data.

Abnormality solver 112*e* may store instructions and/or data that may cause or enable the simulation generation and abnormality detection computing platform 110 to retrieve, from the database 112*c*, one or more resolutions to identified abnormalities and automatically execute those resolution(s) to address any abnormalities detected in the deployed version of the application or system. For instance, the abnormality solver may update fonts, modify color schemes, reduce or compress image or video size, remove videos from a page, or the like, based on resolutions stored in the database 112*c*. In some examples, machine learning may be used to identify a potential resolution to a detected abnormality. For instance, machine learning engine 112*f* may include a machine learning model configured to receive, as inputs, the detected abnormality and, upon execution of the model, output one or more potential resolutions. In some examples, the machine learning model may be trained using historical resolution data.

In some examples, the abnormality solver 112*e* may include a use case prioritization engine. The use case prioritization engine may evaluate usage of an application or system in which an abnormality is detected and prioritize resolution (e.g., by the abnormality solver 112*e*) of applications or systems having greater impact (e.g., if 80% of users of Application A are getting a blank page when they try to load the application, and 40% of users have an illegible font on Application B, the use case prioritization engine may prioritize the abnormality in Application A for resolution by the abnormality solver 112*e*).

Database 112*c* may store data related to simulated scenarios, connectivity (e.g., between applications, within applications, or the like), certificates for various sites, detected abnormalities, successful resolutions, and/or other data that enables performance of aspects described herein by the simulation generation and abnormality detection computing platform 110.

FIGS. 2A-2D depict one example illustrative event sequence for implementing simulation generation and abnormality detection functions in accordance with one or more aspects described herein. The events shown in the illustrative event sequence are merely one example sequence and additional events may be added, or events may be omitted, without departing from the invention. Further, one or more processes discussed with respect to FIGS. 2A-2D may be performed in real-time or near real-time.

Figure 2A:
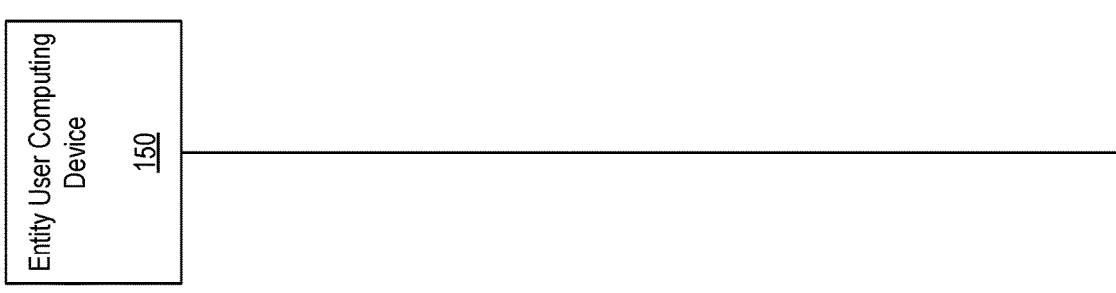
FIGS. 2A-2D depict an illustrative event sequence for simulation generation and abnormality detection in accordance with one or more aspects described herein.
Figure 2A:
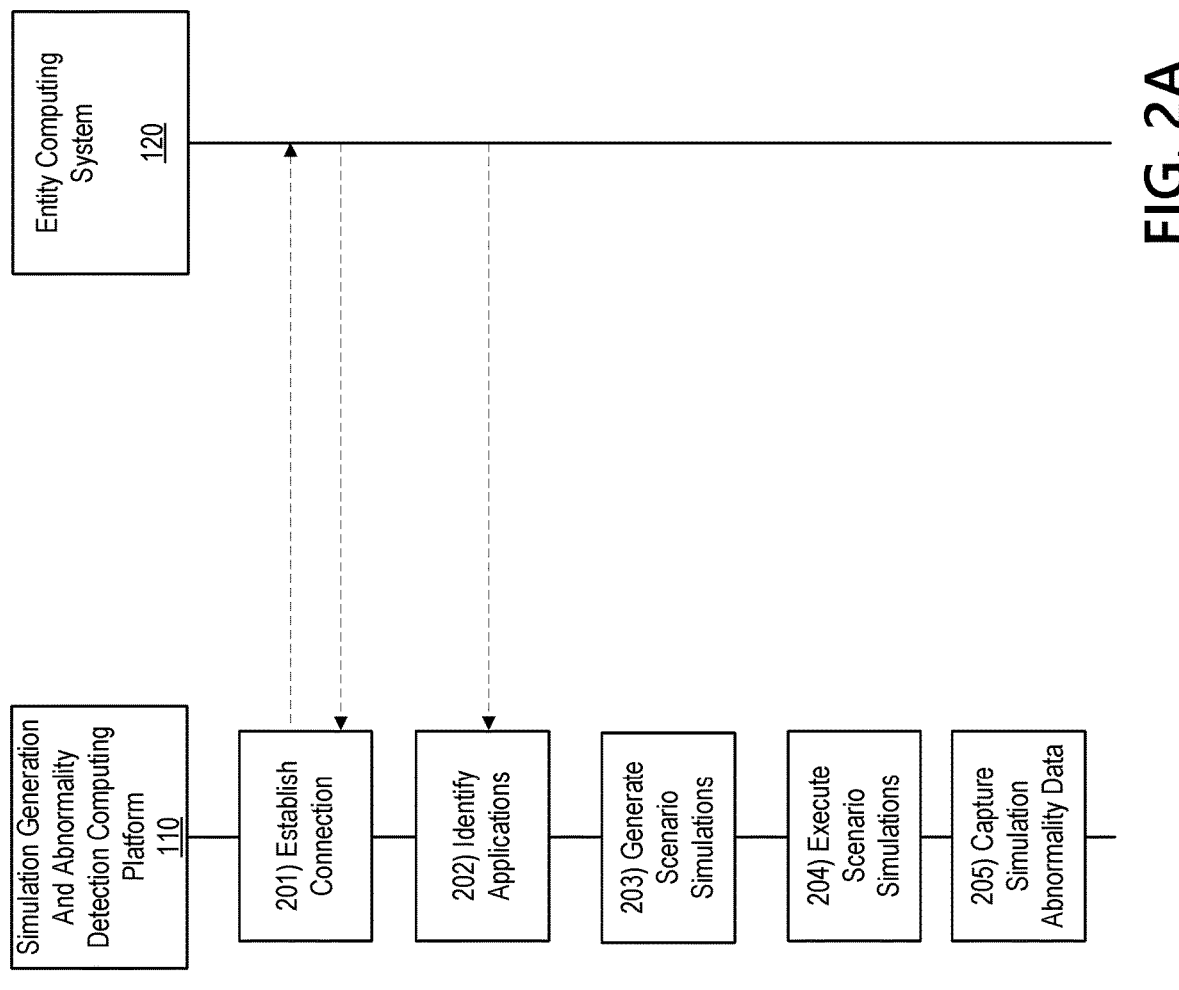

With reference to FIG. 2A, at step 201, simulation generation and abnormality detection computing platform 110 may establish a connection with entity computing system 120. For instance, simulation generation and abnormality detection computing platform 110 may establish a first wireless connection with entity computing system 120. Upon establishing the first wireless connection, a communication session may be initiated between simulation generation and abnormality detection computing platform 110 and entity computing system 120.

Although only one entity computing system 120 is shown in FIGS. 2A-2D, additional entity computing systems, such as entity computing system 125, may be used and additional connections may be established, applications identified, and the like, from additional entity computing systems without departing from the invention.

At step 202, simulation generation and abnormality detection computing platform 110 may identify one or more applications or systems for evaluation. For instance, in some examples, all applications hosted by or executing on entity computing system 120 may be identified for evaluation. Additionally or alternatively, applications having at least a threshold number of users, amount of traffic, or the like, may be identified for evaluation. Additional criteria may be used to identify applications without departing from the invention.

At step 203, simulation generation and abnormality detection computing platform 110 may generate one or more simulations or simulated scenarios. For instance, simulation generation and abnormality detection computing platform 110 may identify one or more simulations of communications within an application, communications between applications, API calls, user interface displays for an application, or the like.

At step 204, simulation generation and abnormality detection computing platform 110 may execute the identified simulation scenarios. For instance, simulation generation and abnormality detection computing platform 110 may execute each identified simulation scenario on a version of the application or system in a secure testing environment. For instance, simulation generation and abnormality detection computing platform 110 may simulate each identified scenario in a secure computing environment to detect any abnormalities (e.g., inaccurate display of text, inaccurate date, slow loading data, issues with display of images or video, or the like).

In some examples, upon detecting an abnormality, simulation generation and abnormality detection computing platform 110 may execute one or more commands or instructions including a potential resolution to the abnormality detected in the simulated scenario. For instance, simulation generation and abnormality detection computing platform 110 may execute one or more commands or instructions attempting to automatically resolve the abnormality detected in the simulated scenario (e.g., replace font with standard font, compress image size, or the like). If the attempted resolution is successful, the resolution may be stored.

At step 205, based on the executed simulated scenarios, simulation generation and abnormality detection computing platform 110 may capture any detected abnormalities, as well as any successful resolutions to the abnormalities detected in the simulated scenarios. In some examples, capturing detected abnormalities may include capturing abnormalities detected upstream and/or downstream of the application being evaluated. For instance, if an issue with Application A causes issues with downstream Application C, the abnormality may be captured for both Application A and Application C. Accordingly, by testing all links, communications, and the like, associated with an application, the interactions between a particular application and other applications that feed data into the application, or receive outputs from the application, may be evaluated for potential abnormalities.

Figure 2B:
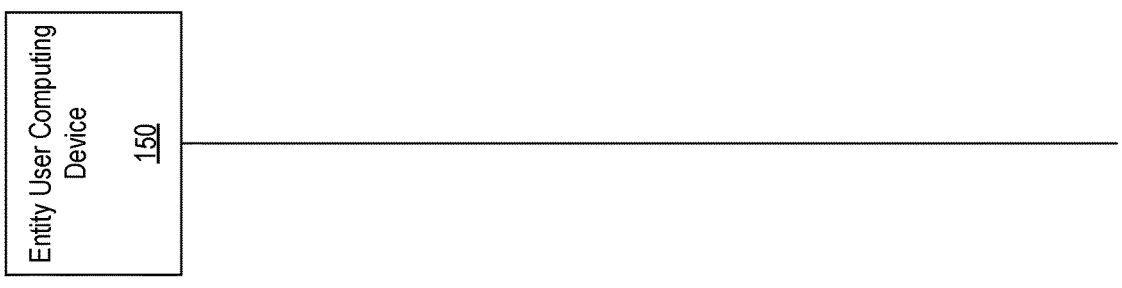
Figure 2B:
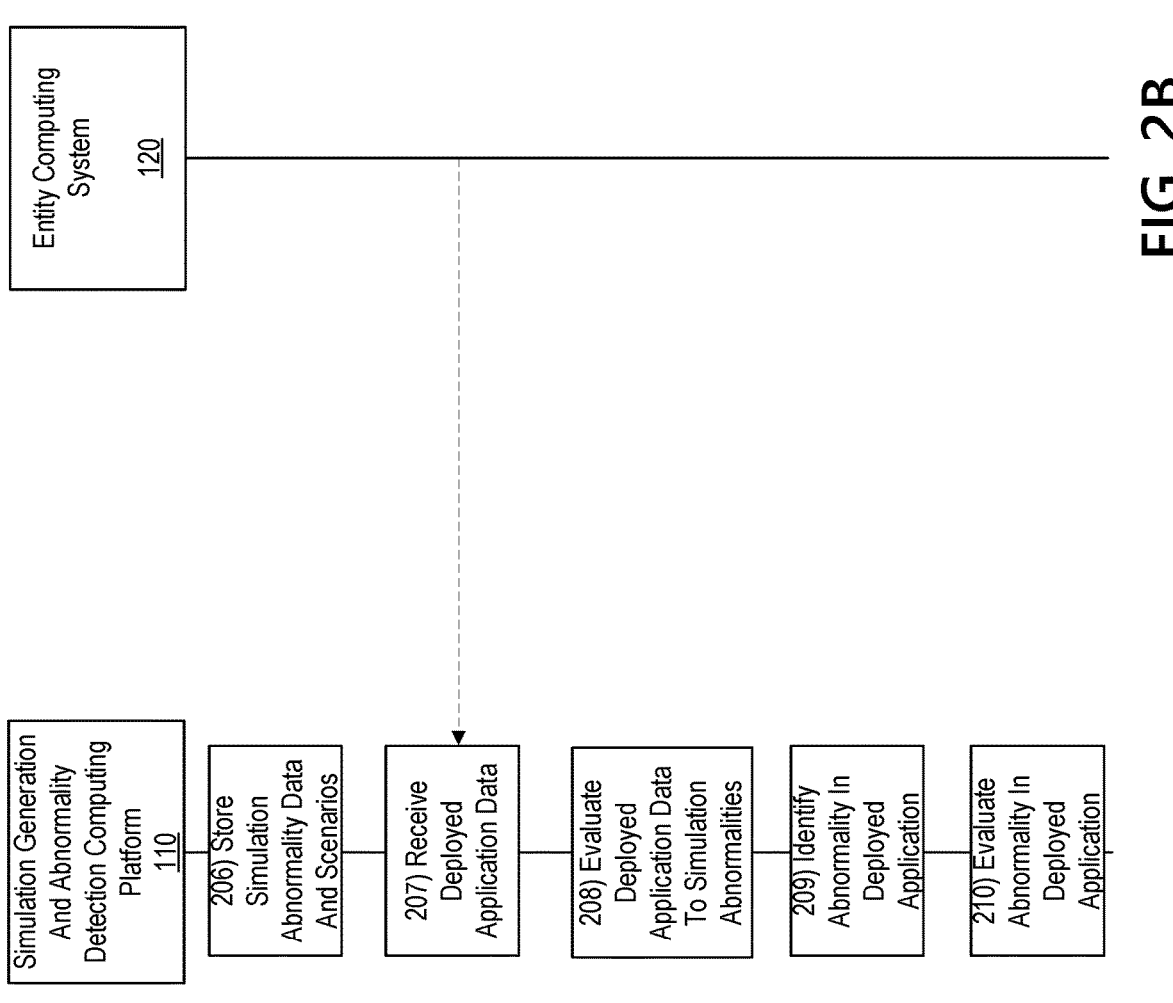

With reference to FIG. 2B, at step 206, simulation generation and abnormality detection computing platform 110 may store the detected abnormalities in, for instance, database 112*c*. In some examples, the scenario that prompted the abnormality may also be stored (e.g., in association with the abnormality), as well as any resolutions that were successfully executed on the abnormalities detected in the simulated scenarios.

At step 207, simulation generation and abnormality detection computing platform 110 may receive deployed application data. For instance, simulation generation and abnormality detection computing platform 110 may receive or evaluate applications deployed in a production environment that correspond to the applications evaluated using the simulated scenarios.

At step 208, the deployed application data may be analyzed to determine whether abnormalities detected in the simulated scenarios exist in the deployed applications. In some examples, a machine learning model may be used to evaluate the deployed application data. For instance, the machine learning model may receive, as inputs, the deployed application parameters, data, APIs, or the like, as well as the abnormalities detected in the simulated scenarios, and may identify patterns or sequences in the data to identify corresponding abnormalities in the deployed application. In some examples, the machine learning model may be trained using historical abnormality data (e.g., issues that were previously detected, applications impacted, and the like). Accordingly, the machine learning model may learn to recognize patterns or sequences in applications, communications, abnormalities, and the like.

In some examples, the machine learning model may be or include one or more supervised learning models (e.g., decision trees, bagging, boosting, random forest, neural networks, linear regression, artificial neural networks, logical regression, support vector machines, and/or other models), unsupervised learning models (e.g., clustering, anomaly detection, artificial neural networks, and/or other models), knowledge graphs, simulated annealing algorithms, hybrid quantum computing models, and/or other models. In some examples, training the machine learning model may include training the model using labeled data (e.g., labeled data identifying detected abnormalities, associated applications, and the like) and/or unlabeled data.

At step 209, based on the evaluation at step 208, simulation generation and abnormality detection computing platform 110 may identify one or more abnormalities in the deployed application being evaluated (or in one or more applications if a plurality of applications are being evaluated in parallel). In some examples, the identified one or more abnormalities may be output by the machine learning model.

At step 210, the identified abnormalities may be evaluated to determine whether it may be automatically resolved by the simulation generation and abnormality detection computing platform 110. For instance, simulation generation and abnormality detection computing platform 110 may evaluate the identified abnormality and determine whether a successful resolution to the abnormality was performed in the simulated scenario. In some examples, the machine learning model may be used to determine whether an automatic resolution is available for the identified abnormality. In some examples, the machine learning model may receive, as inputs, the identified abnormality and application information, and may identify patterns or sequences in the data to output a resolution to the abnormality. In some examples, the machine learning model may be further trained using historical resolution data (e.g., successful resolution of previous abnormalities, successful resolution of abnormalities detected in the simulated scenarios, and the like). In some examples, the machine learning model may be or include one or more supervised learning models (e.g., decision trees, bagging, boosting, random forest, neural networks, linear regression, artificial neural networks, logical regression, support vector machines, and/or other models), unsupervised learning models (e.g., clustering, anomaly detection, artificial neural networks, and/or other models), knowledge graphs, simulated annealing algorithms, hybrid quantum computing models, and/or other models. In some examples, training the machine learning model may include training the model using labeled data (e.g., labeled data identifying detected abnormalities and associated successful resolutions) and/or unlabeled data.

Figure 2C:
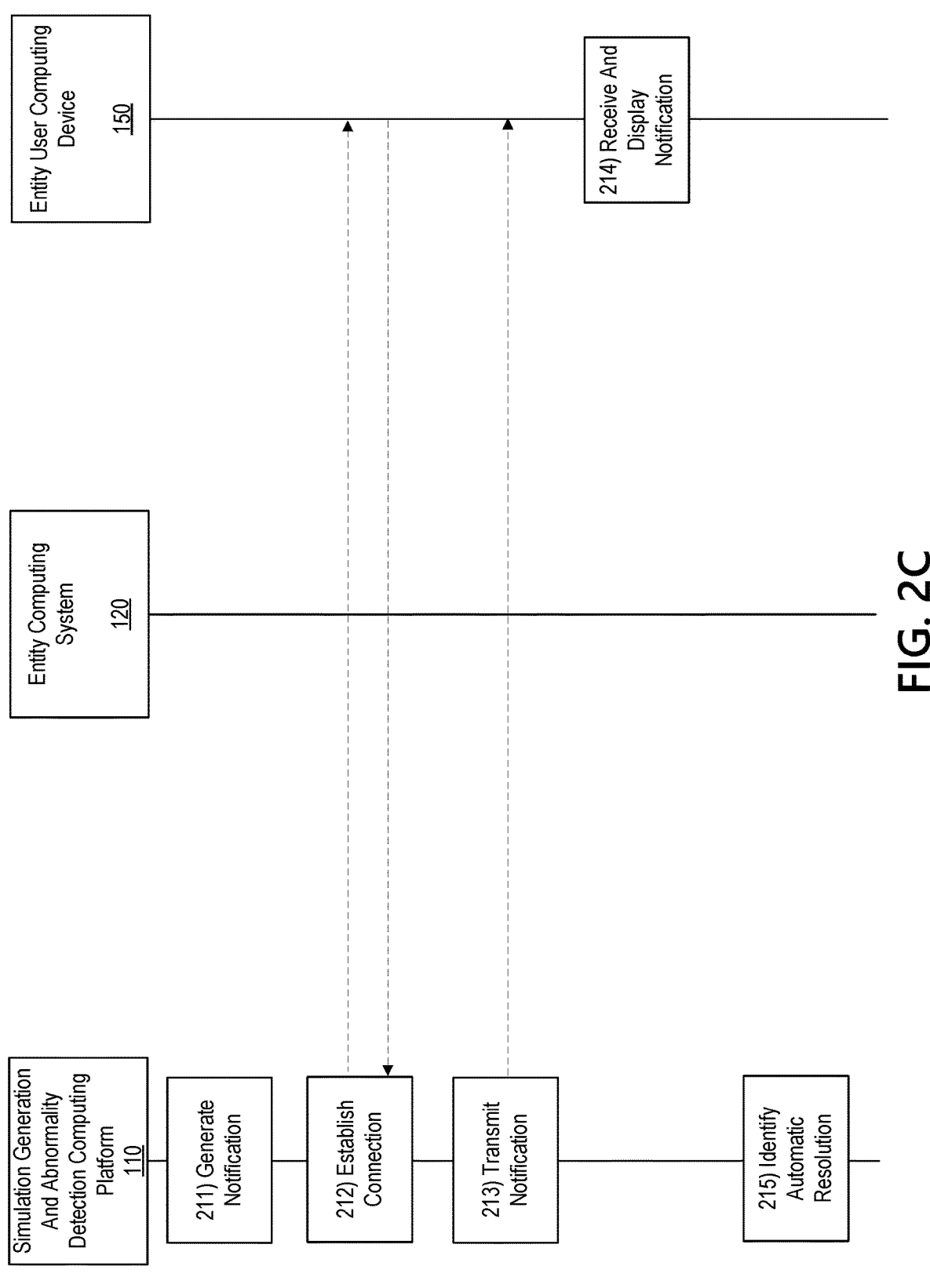
Figure 4:
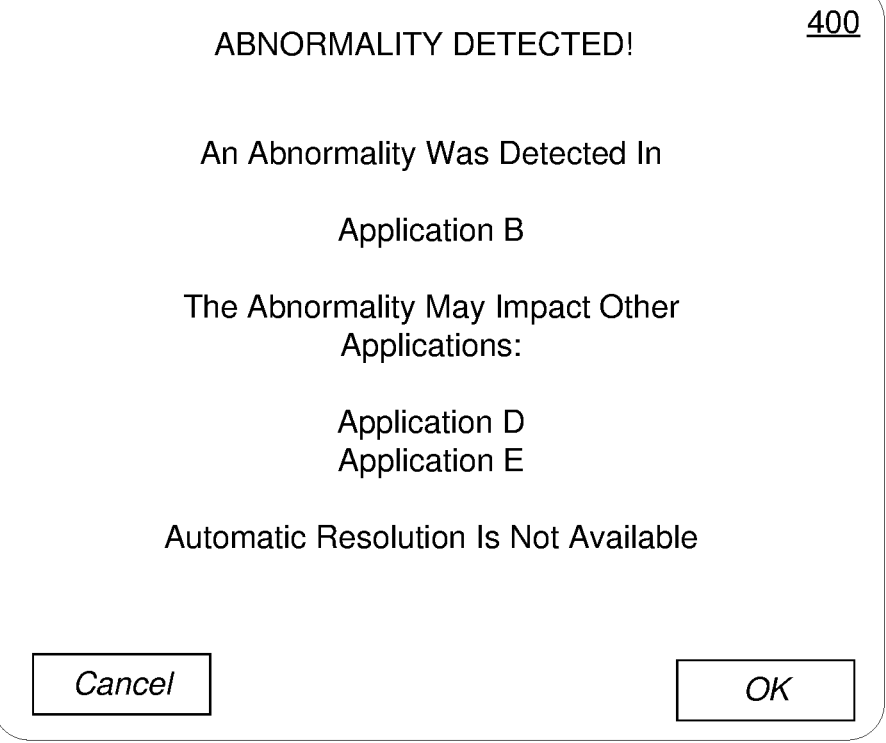
FIG. 4 illustrates an example graphical user interface that may be generated in accordance with one or more aspects described herein.

If, at step 210, the evaluation of the detected abnormality in the deployed application does not have a resolution that may be automatically executed, at step 211 in FIG. 2C, simulation generation and abnormality detection computing platform 110 may generate a notification indicating that an abnormality was identified in a particular application and that an automatic resolution is not available. For instance, FIG. 4 illustrates one example notification 400 that may be generated. As shown in FIG. 4, user interface 400 may include identification of detection of an abnormality in a particular application (e.g., "Application A"). The notification 400 may further include identification of other applications that may be impacted by the abnormality (e.g., "Application D," "Application E"). In some examples, the additional applications impacted may be identified from the simulated scenario associated with the identified abnormality. For instance, if an abnormality is detected in Application A, the simulated scenario associated with detection of the particular abnormality may be used to identify other applications impacted by the abnormality (e.g., as determined or identified in the simulated scenario).

At step 212, simulation generation and abnormality detection computing platform 110 may establish a connection with entity user computing device 140. For instance, simulation generation and abnormality detection computing platform 110 may establish a second wireless connection with entity user computing device 140. Upon establishing the second wireless connection, a communication session may be initiated between simulation generation and abnormality detection computing platform 110 and entity user computing device 140.

At step 213, simulation generation and abnormality detection computing platform 110 may transmit or send the generated notification to the entity user computing device 140. For instance, simulation generation and abnormality detection computing platform 110 may transmit or send the notification via the communication session initiated upon establishing the second wireless connection. In some examples, transmitting or sending the notification may cause the notification to be displayed by a display of the entity user computing device 140.

At step 214, entity user computing device 140 may receive and display the notification.

Returning to step 210, the evaluation of the detected abnormality in the deployed application does have a resolution that may be automatically executed, at step 215, simulation generation and abnormality detection computing platform 110 may identify the available automatic resolution for the identified abnormality. For instance, if the abnormality includes incorrect display of a custom font, the simulation generation and abnormality detection computing platform 110 may identify a standard font that may be used to replace the custom font via an automated process (e.g., without user interaction).

Figure 2D:
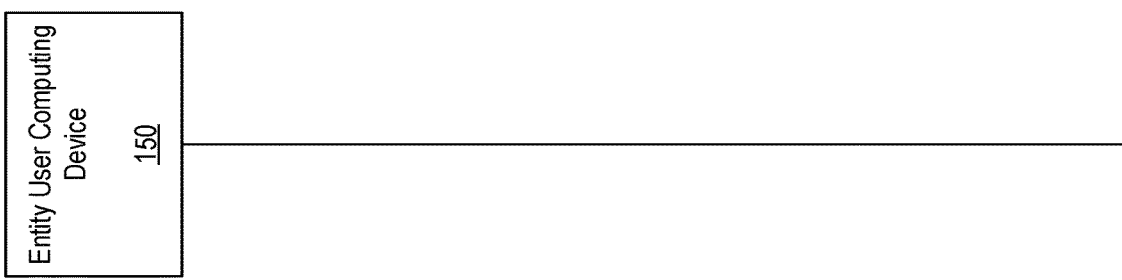
Figure 2D:
Figure 2D:
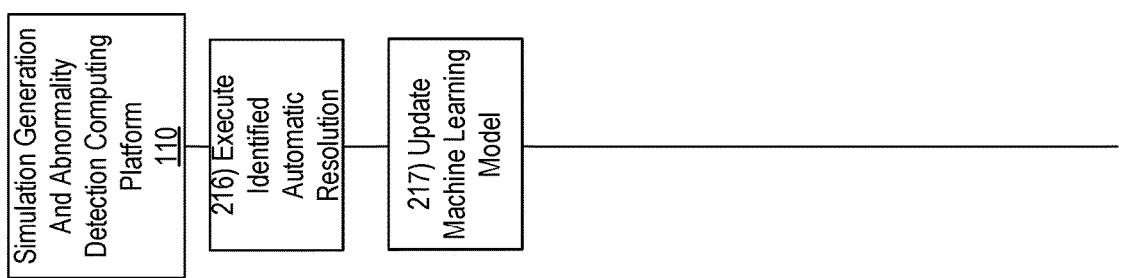

With reference to FIG. 2D, at step 216, simulation generation and abnormality detection computing platform 110 may automatically execute the identified resolution to resolve the abnormality in the deployed application.

At step 217, simulation generation and abnormality detection computing platform 110 may update or validate the machine learning model. For instance, an outcome of evaluation of the abnormality for automatic resolution, execution of automatic resolution, or the like, may be provided via a dynamic feedback loop to continuously update or validate the machine learning model, thereby continuously improving accuracy of model outputs.

In some instances, simulation generation and abnormality detection computing platform 110 may continuously update, validate, refine, or the like, the machine learning model. In some examples, the simulation generation and abnormality detection computing platform 110 may maintain an accuracy threshold for the machine learning model and may pause refinement (through the dynamic feedback loop) of the model if the corresponding accuracy is identified as greater than the accuracy threshold. Further, if the accuracy is at or below the accuracy threshold, the simulation generation and abnormality detection computing platform 110 may resume refinement of the model through the corresponding dynamic feedback loop.

Although aspects described with respect to FIGS. 2A-2D include a simulator proxy generating and executing simulations and an analyzer then analyzing the deployed applications to determine whether abnormalities exist, in some examples, these processes may run in parallel with continuous or near continuous monitoring or deployed applications or systems to detect, in real-time, abnormalities and quickly resolve any detected abnormalities.

Figure 3:
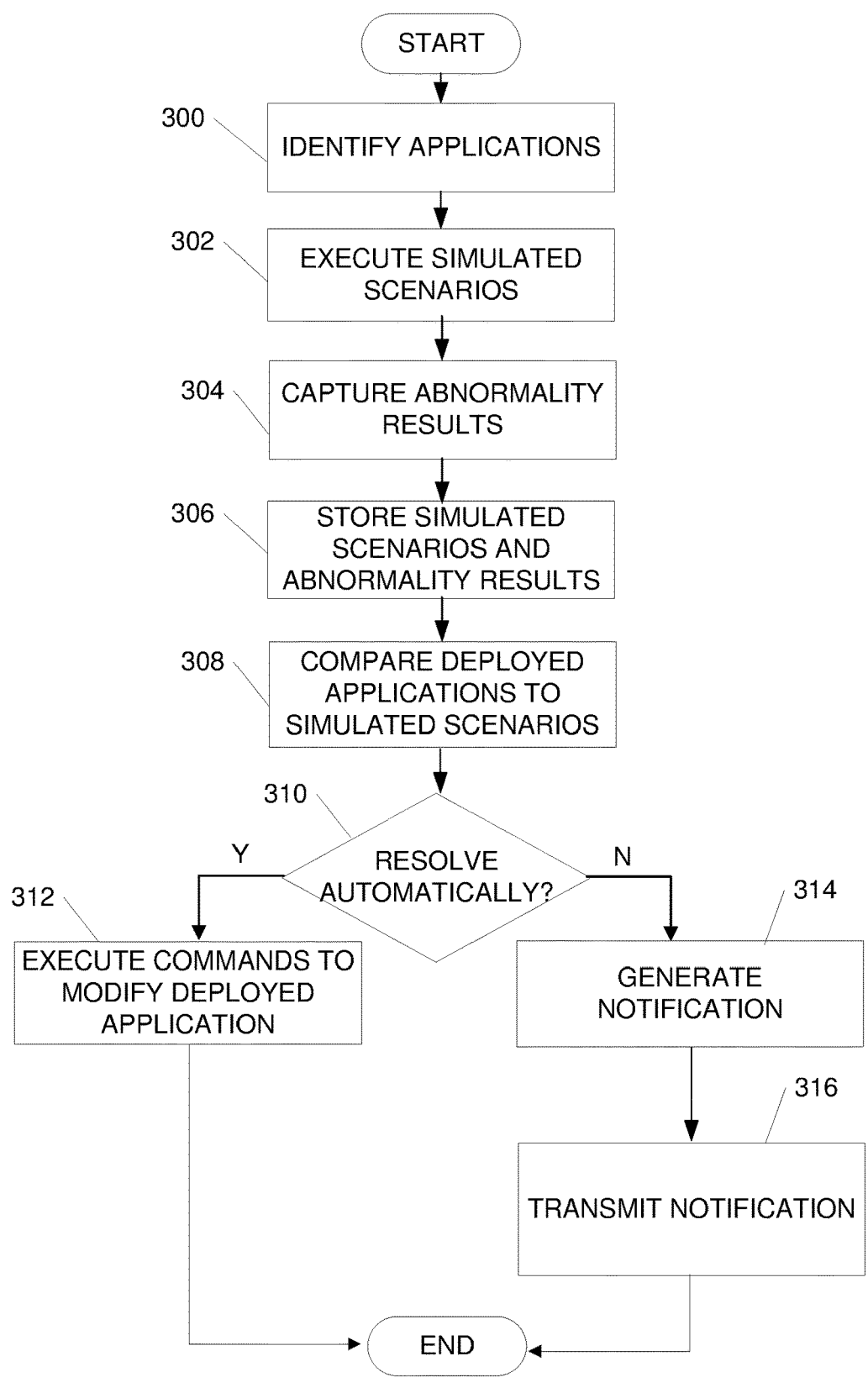
FIG. 3 depicts an illustrative method for simulation generation and abnormality detection in accordance with one or more aspects described herein.

FIG. 3 is a flow chart illustrating one example method of simulation generation and abnormality detection in accordance with one or more aspects described herein. The processes illustrated in FIG. 3 are merely some example processes and functions. The steps shown may be performed in the order shown, in a different order, more steps may be added, or one or more steps may be omitted, without departing from the invention. In some examples, one or more steps may be performed simultaneously with other steps shown and described. One of more steps shown in FIG. 3 may be performed in real-time or near real-time.

At step 300, a computing platform, such as simulation generation and abnormality detection computing platform 110, may identify a plurality of applications for evaluation or analysis. For instance, the computing platform may identify a plurality of applications associated with an enterprise organization to be analyzed or evaluated for abnormalities using the arrangements described herein. In some examples, one or more applications of the plurality of applications may be customer-facing applications associated with the enterprise organization. Additionally or alternatively, one or more applications of the plurality of applications may be internal applications used by one or more employees or other associates of the enterprise organization.

At step 302, an abnormality simulator proxy of the computing platform may execute a plurality of simulated scenarios for each application of the plurality of applications identified for analysis. For instance, the abnormality simulator proxy may identify communications within each application, between applications, API calls associated with each application, text, images or videos displayed by each application, and the like, and may generate and execute simulations of each scenario (e.g., each communication, API call, UI with text, images or videos displayed, or the like). The simulations may be executed in a secure environment to identify any abnormalities in each application of the plurality of applications.

In some examples, executing the simulated scenarios for each application may include identifying and/or executing one or more potential resolutions to any identified or detected abnormalities. For instance, the abnormality simulator proxy may attempt to resolve any identified or detected abnormalities by executing one or more potential resolutions.

At step 304, the computing platform may capture abnormality results generated based on execution of the simulated scenarios. For instance, any detected or identified abnormalities that occurred during execution of the simulated scenarios may be captured in the abnormality results.

In some examples, capturing the abnormality results may further include capturing a resolution (or a plurality of resolutions), of the one or more potential resolutions, that resolved one or more of the abnormalities detected in the simulated scenarios (e.g., a successful resolution to an abnormality may be captured).

At step 306, the computing platform may store, in a database, the abnormality results and simulated scenarios for each application. In some examples, the computing platform may further store the resolution that successfully resolved the one or more abnormalities detected in the simulated scenarios.

At step 308, the computing platform may receive deployed application data corresponding to the identified plurality of applications and may compare the deployed versions of each application to the plurality of simulated scenarios and the captured abnormality results for a corresponding application to identify an abnormality in a deployed version of an application. In some examples, abnormalities may include at least one of: an incorrectly displayed font, an image or video that does not load properly, an image or video that has a load time greater than a threshold time or an expected time, or the like.

At step 310, the computing platform may evaluate, based on the identified abnormality in the deployed version of the application and via an abnormality solver of the computing platform, the identified abnormality to determine whether it can be resolved automatically (e.g., by the computing platform and without user input or interaction). In some examples, evaluating whether the identified abnormality can be resolved automatically may include determining whether a stored resolution to the identified abnormality exists for the identified abnormality (e.g., a resolution captured and stored during execution of the simulated scenarios).

If, at step 310, the identified abnormality cannot be resolved automatically, at step 312, a notification may be generated by the computing platform. In some examples, the notification may include identification of the abnormality, an associated application, other impacted applications (e.g., upstream or downstream applications), and the like. At step 314, the notification may be transmitted to a computing device, such as an administrator computing device, for display by the administrator computing device.

If, at step 310, the identified abnormality can be resolved automatically, at step 316, the computing platform may execute one or more commands to modify the deployed application to resolve the identified abnormality. In some arrangements, executing the one or more commands to modify the deployed application may include identifying the stored resolution that exists to resolve the identified abnormality and executing the stored resolution. For instance, the identified abnormality may include a custom font that does not display correctly. A successful resolution identified via the simulated scenarios may include replacing the custom font with a standard font that displays correctly. Accordingly, the computing platform may retrieve the stored resolution and execute one or more commands to modify the deployed application to replace the custom font with the standard font.

As discussed herein, aspects described provide for secure identification of abnormalities in applications, systems, and the like, using, for instance, system simulations, and, in some examples, automatic resolution of detected abnormalities. Accordingly, the arrangements described herein enable error detection in multiple, large distributed systems and enable resolution on the fly. As discussed, the arrangement provided use system simulation to identify errors, determine a cause of the error and resolve the error.

Some example use cases of the simulation generation and abnormality detection computing platform 110 and arrangements described herein are provided below. The use cases described are merely some example user cases and aspects described herein may be used in other use cases without departing from the invention.

In some examples, customer facing applications may include various fonts, images, and the like. During a testing phase of an application, it may be difficult for developers to test all use cases or scenarios to determine whether fonts, images, and the like, are displaying correctly and/or are legible to users. Accordingly, the simulation generation and abnormality detection computing platform 110 may simulate the customer facing application and determine that it does not support certain fonts, different languages, or the like. In some examples, the simulated scenarios may include use of different web browsers and/or devices to attempt to load an application or page in order to determine whether abnormalities exist for some browsers and not others or some devices and not others. The simulated scenarios may determine whether fonts and/or images are properly rendered. If they do not render properly, this may be captured by the abnormality simulator proxy as an abnormality and stored.

In another example, in some arrangements, fonts might not be legible due to a background color being incompatible with a font color. This abnormality may be captured by the abnormality simulator proxy and stored.

The detected and/or stored abnormalities (e.g., fonts or images not rendering properly, fonts being illegible, or the like) may be analyzed by the abnormality analyzer to determine whether the abnormalities detected in the simulated scenarios are present in real-time in the deployed application. If so, the abnormality solver may be used to identify and attempt an automatic resolution of the font or images issues identified in the deployed application. For instance, the abnormality solver may replace custom fonts with standard fonts that may render properly and be legible (e.g., in all browsers, for all devices, or the like). In another example, if an image is nor rendering properly, the solver may compress the image or use a smaller image to improve loading speed or rendering quality. These modifications of the deployed application may be performed automatically without user interaction.

In another example use case, in some examples, videos provided via an application may include audio transcripts, sign language interpretation, or the like, that may be provided for hard of hearing viewers. In some examples, a video may load but the transcript and/or sign language interpretation might not display or might not display properly. This abnormality may be detected by the abnormality simulator proxy and stored. The abnormality analyzer may analyze the abnormality and identify that the transcript or interpretation is not properly visible and the abnormality solver may automatically generate a transcript of the content of the video and update the deployed application to include the generated transcript.

In yet another example use case, in a dynamic API system, API errors may be detected in real-time. For instance, if an actual API response does not match an expected response, the solver may generate a response (e.g., using machine learning or artificial intelligence). For instance, a since API call may include a plurality of internal micro-app calls. If the API call fails, the arrangement described herein can quickly identify a cause of the failure (e.g., if one or more micro-app calls failed) and resolve the issue to ensure continuous access.

In still another example use case, the arrangements described herein may be used to identify and implement contingency plans. For instance, an application with a dependency on a first data center may go through a first service to access the first data center. If the first data center or first service has an issue (e.g., data is not accessible), the simulator proxy and analyzer may detect the issue and the abnormality solver may automatically write code to access a second data center or use a second service to access the first data center.

In still another example, some applications may use text, video and an animated guide. However, the amount of media may slow the app or make is cumbersome to use. Accordingly, users might only view the text and might not view videos or the animated guide (e.g., because of the application is not responsive enough). Accordingly, the proxy and analyzer may detect an issue and identify that the page or application is slow to load. The solver may then recommend (e.g., based on machine learning analysis) recommendations to make the application or page faster, may remove code automatically to make the page more user friendly, or the like. In some examples, the machine learning model may be used to analyze user interactions with a page or application to output recommended resolutions. For instance, user impressions (e.g., number of clicks of a video or the like) may be captured and analyzed to determine that large multimedia might not be frequently accessed by users and the presence might cause the entire page to load slowly. Accordingly, the solver may remove some video not be accessed by the users to improve the responsiveness of the page.

In another example, if the simulation generation and abnormality detection computing platform 110 detects that users refresh a page at least a threshold number of times without playing a particular video, the computing platform may determine that the video is causing issues and may remove the video.

In some examples, aspects described herein may be used to customize applications, web pages, or the like for particular business units, geographic regions, or even for particular users. For instance, user interactions with a page or application (e.g., number of links clicked, videos played, page refresh, or the like) may be captured and analyzed, using a machine learning model associated with the abnormality solver, to identify modifications to an application or page that would make the application or page more accommodating for the particular user, geographic region, business unit, or the like. Accordingly, the arrangements described herein may be used to not only resolve issues with proper functioning of an application or system, but also to customize a user experience by making information more accessible to a user.

Figure 5:
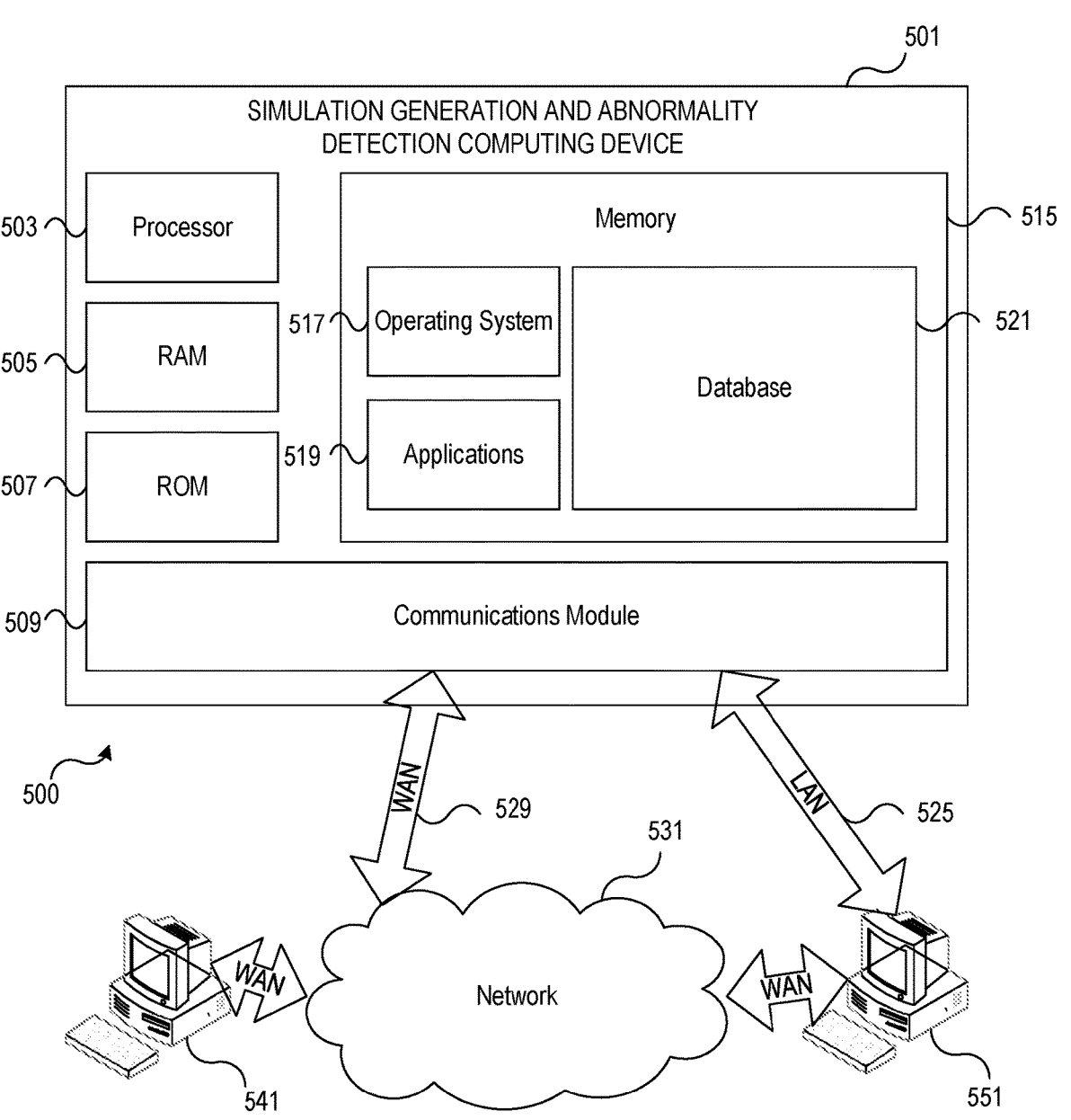
FIG. 5 illustrates one example environment in which various aspects of the disclosure may be implemented in accordance with one or more aspects described herein.

FIG. 5 depicts an illustrative operating environment in which various aspects of the present disclosure may be implemented in accordance with one or more example embodiments. Referring to FIG. 5, computing system environment 500 may be used according to one or more illustrative embodiments. Computing system environment 500 is only one example of a suitable computing environment and is not intended to suggest any limitation as to the scope of use or functionality contained in the disclosure. Computing system environment 500 should not be interpreted as having any dependency or requirement relating to any one or combination of components shown in illustrative computing system environment 500.

Computing system environment 500 may include simulation generation and abnormality detection computing device 501 having processor 503 for controlling overall operation of simulation generation and abnormality detection computing device 501 and its associated components, including Random Access Memory (RAM) 505, Read-Only Memory (ROM) 507, communications module 509, and memory 515. Simulation generation and abnormality detection computing device 601 may include a variety of computer readable media. Computer readable media may be any available media that may be accessed by simulation generation and abnormality detection computing device 501, may be non-transitory, and may include volatile and nonvolatile, removable and non-removable media implemented in any method or technology for storage of information such as computer-readable instructions, object code, data structures, program modules, or other data. Examples of computer readable media may include Random Access Memory (RAM), Read Only Memory (ROM), Electronically Erasable Programmable Read-Only Memory (EEPROM), flash memory or other memory technology, Compact Disk Read-Only Memory (CD-ROM), Digital Versatile Disk (DVD) or other optical disk storage, magnetic cassettes, magnetic tape, magnetic disk storage or other magnetic storage devices, or any other medium that can be used to store the desired information and that can be accessed by simulation generation and abnormality detection computing device 501.

Although not required, various aspects described herein may be embodied as a method, a data transfer system, or as a computer-readable medium storing computer-executable instructions. For example, a computer-readable medium storing instructions to cause a processor to perform steps of a method in accordance with aspects of the disclosed embodiments is contemplated. For example, aspects of method steps disclosed herein may be executed on a processor on simulation generation and abnormality detection computing device 501. Such a processor may execute computer-executable instructions stored on a computer-readable medium.

Software may be stored within memory 515 and/or storage to provide instructions to processor 503 for enabling simulation generation and abnormality detection computing device 501 to perform various functions as discussed herein. For example, memory 515 may store software used by simulation generation and abnormality detection computing device 501, such as operating system 517, application programs 519, and associated database 521. Also, some or all of the computer executable instructions for simulation generation and abnormality detection computing device 501 may be embodied in hardware or firmware. Although not shown, RAM 505 may include one or more applications representing the application data stored in RAM 505 while simulation generation and abnormality detection computing device 501 is on and corresponding software applications (e.g., software tasks) are running on simulation generation and abnormality detection computing device 501.

Communications module 509 may include a microphone, keypad, touch screen, and/or stylus through which a user of simulation generation and abnormality detection computing device 501 may provide input, and may also include one or more of a speaker for providing audio output and a video display device for providing textual, audiovisual and/or graphical output. Computing system environment 500 may also include optical scanners (not shown).

Simulation generation and abnormality detection computing device 501 may operate in a networked environment supporting connections to one or more other computing devices, such as computing device 541 and 551. Computing devices 541 and 551 may be personal computing devices or servers that include any or all of the elements described above relative to simulation generation and abnormality detection computing device 501.

The network connections depicted in FIG. 5 may include Local Area Network (LAN) 525 and Wide Area Network (WAN) 529, as well as other networks. When used in a LAN networking environment, simulation generation and abnormality detection computing device 501 may be connected to LAN 525 through a network interface or adapter in communications module 509. When used in a WAN networking environment, simulation generation and abnormality detection computing device 501 may include a modem in communications module 509 or other means for establishing communications over WAN 529, such as network 531 (e.g., public network, private network, Internet, intranet, and the like). The network connections shown are illustrative and other means of establishing a communications link between the computing devices may be used. Various well-known protocols such as Transmission Control Protocol/Internet Protocol (TCP/IP), Ethernet, File Transfer Protocol (FTP), Hypertext Transfer Protocol (HTTP) and the like may be used, and the system can be operated in a client-server configuration to permit a user to retrieve web pages from a web-based server.

The disclosure is operational with numerous other computing system environments or configurations. Examples of computing systems, environments, and/or configurations that may be suitable for use with the disclosed embodiments include, but are not limited to, personal computers (PCs), server computers, hand-held or laptop devices, smart phones, multiprocessor systems, microprocessor-based systems, set top boxes, programmable consumer electronics, network PCs, minicomputers, mainframe computers, distributed computing environments that include any of the above systems or devices, and the like that are configured to perform the functions described herein.

One or more aspects of the disclosure may be embodied in computer-usable data or computer-executable instructions, such as in one or more program modules, executed by one or more computers or other devices to perform the operations described herein. Generally, program modules include routines, programs, objects, components, data structures, and the like that perform particular tasks or implement particular abstract data types when executed by one or more processors in a computer or other data processing device. The computer-executable instructions may be stored as computer-readable instructions on a computer-readable medium such as a hard disk, optical disk, removable storage media, solid-state memory, RAM, and the like. The functionality of the program modules may be combined or distributed as desired in various embodiments. In addition, the functionality may be embodied in whole or in part in firmware or hardware equivalents, such as integrated circuits, Application-Specific Integrated Circuits (ASICs), Field Programmable Gate Arrays (FPGA), and the like. Particular data structures may be used to more effectively implement one or more aspects of the disclosure, and such data structures are contemplated to be within the scope of computer executable instructions and computer-usable data described herein.

Various aspects described herein may be embodied as a method, an apparatus, or as one or more computer-readable media storing computer-executable instructions. Accordingly, those aspects may take the form of an entirely hardware embodiment, an entirely software embodiment, an entirely firmware embodiment, or an embodiment combining software, hardware, and firmware aspects in any combination. In addition, various signals representing data or events as described herein may be transferred between a source and a destination in the form of light or electromagnetic waves traveling through signal-conducting media such as metal wires, optical fibers, or wireless transmission media (e.g., air or space). In general, the one or more computer-readable media may be and/or include one or more non-transitory computer-readable media.

As described herein, the various methods and acts may be operative across one or more computing servers and one or more networks. The functionality may be distributed in any manner, or may be located in a single computing device (e.g., a server, a client computer, and the like). For example, in alternative embodiments, one or more of the computing platforms discussed above may be combined into a single computing platform, and the various functions of each computing platform may be performed by the single computing platform. In such arrangements, any and/or all of the above-discussed communications between computing platforms may correspond to data being accessed, moved, modified, updated, and/or otherwise used by the single computing platform. Additionally or alternatively, one or more of the computing platforms discussed above may be implemented in one or more virtual machines that are provided by one or more physical computing devices. In such arrangements, the various functions of each computing platform may be performed by the one or more virtual machines, and any and/or all of the above-discussed communications between computing platforms may correspond to data being accessed, moved, modified, updated, and/or otherwise used by the one or more virtual machines.

Aspects of the disclosure have been described in terms of illustrative embodiments thereof. Numerous other embodiments, modifications, and variations within the scope and spirit of the appended claims will occur to persons of ordinary skill in the art from a review of this disclosure. For example, one or more of the steps depicted in the illustrative figures may be performed in other than the recited order, one or more steps described with respect to one figure may be used in combination with one or more steps described with respect to another figure, and/or one or more depicted steps may be optional in accordance with aspects of the disclosure.

What is claimed is:

1. A computing platform, comprising:
at least one processor;
a communication interface communicatively coupled to the at least one processor; and
a memory storing computer-readable instructions that, when executed by the at least one processor, cause the computing platform to:
identify a plurality of applications for analysis;
execute, via an abnormality simulator proxy, a plurality of simulated scenarios for each application of the plurality of applications identified for analysis, wherein executing the plurality of simulated scenarios for each application includes injecting errors into simulations of each application and observing an impact of the errors on a respective application simulation and applications upstream and downstream from the respective application;
capture, based on execution of the plurality of simulated scenarios for each application of the plurality of applications identified for analysis, abnormality results for each application;
store, in a database, the plurality of simulated scenarios and the captured abnormality results for each application;
compare, via an abnormality analyzer, deployed versions of each application to the plurality of simulated scenarios and the captured abnormality results for a corresponding application to identify an abnormality in a deployed version of an application;
evaluate, based on the identified abnormality in the deployed version of the application and via an abnormality solver, the identified abnormality to determine whether it can be resolved automatically;
responsive to determining that the identified abnormality cannot be resolved automatically:
generate a notification including the identified abnormality in the deployed version of the application and identifying the deployed version of the application;
transmit, to an administrator computing device, the generated notification, wherein transmitting the generated notification causes the administrator computing device to display the notification by a display of the administrator computing device; and responsive to determining that the identified abnormality can be resolved automatically, execute one or more commands to modify the deployed version of the application to resolve the identified abnormality.

2. The computing platform of claim 1, wherein the identified abnormality includes at least one of: an incorrectly displayed font, an image that does not load properly, or an image having a load time greater than a threshold time.

3. The computing platform of claim 1, wherein the identified abnormality includes a custom font that does not display correctly and wherein executing one or more commands to modify the deployed version of the application to resolve the identified abnormality includes replacing the custom font that does not display correctly with a standard font.

4. The computing platform of claim 1, wherein the plurality of applications includes customer-facing applications associated with an enterprise organization.

5. The computing platform of claim 1, wherein executing, via the abnormality simulator proxy, the plurality of simulated scenarios for each application of the plurality of applications identified for analysis further includes executing one or more potential resolutions for abnormalities detected in the simulated scenarios.

6. The computing platform of claim 5, wherein capturing, based on execution of the plurality of simulated scenarios for each application of the plurality of applications identified for analysis, abnormality results for each application further includes capturing a resolution, of the one or more potential resolutions, that resolved the abnormalities detected in the simulated scenarios.

7. The computing platform of claim 6, wherein storing, in the database, the plurality of simulated scenarios and the captured abnormality results for each application further includes storing the resolution that resolved the abnormalities detected in the simulated scenarios.

8. The computing platform of claim 7, wherein evaluating, based on the identified abnormality in the deployed version of the application and via the abnormality solver, the identified abnormality to determine whether it can be resolved automatically includes determining whether a stored resolution exists for the identified abnormality.

9. The computing platform of claim 8, wherein responsive to determining that the identified abnormality can be resolved automatically, execute the one or more commands to modify the deployed version of the application to resolve the identified abnormality further includes identifying the stored resolution that exists for the identified abnormality and executing the stored resolution that exists for the identified abnormality.

10. A method, comprising:

identifying, by a computing platform, the computing platform having at least one processor and memory, a plurality of applications for analysis;

executing, by the at least one processor and via an abnormality simulator proxy, a plurality of simulated scenarios for each application of the plurality of applications identified for analysis, wherein executing the plurality of simulated scenarios for each application includes injecting errors into simulations of each application and observing an impact of the errors on a respective application simulation and applications upstream and downstream from the respective application;

capturing, by the at least one processor and based on execution of the plurality of simulated scenarios for each application of the plurality of applications identified for analysis, abnormality results for each application;

storing, in a database, the plurality of simulated scenarios and the captured abnormality results for each application;

comparing, by the at least one processor and via an abnormality analyzer, deployed versions of each application to the plurality of simulated scenarios and the captured abnormality results for a corresponding application to identify an abnormality in a deployed version of an application;

evaluating, by the at least one processor and based on the identified abnormality in the deployed version of the application and via an abnormality solver, the identified abnormality to determine whether it can be resolved automatically;

responsive to determining that the identified abnormality cannot be resolved automatically:

generating, by the at least one processor, a notification including the identified abnormality in the deployed version of the application and identifying the deployed version of the application;

transmitting, by the at least one processor and to an administrator computing device, the generated notification, wherein transmitting the generated notification causes the administrator computing device to display the notification by a display of the administrator computing device; and responsive to determining that the identified abnormality can be resolved automatically, executing, by the at least one processor, one or more commands to modify the deployed version of the application to resolve the identified abnormality.

11. The method of claim 10, wherein the identified abnormality includes at least one of: an incorrectly displayed font, an image that does not load properly, or an image having a load time greater than a threshold time.

12. The method of claim 10, wherein the identified abnormality includes a custom font that does not display correctly and wherein executing one or more commands to modify the deployed version of the application to resolve the identified abnormality includes replacing the custom font that does not display correctly with a standard font.

13. The method of claim 10, wherein the plurality of applications includes customer-facing applications associated with an enterprise organization.

14. The method of claim 10, wherein executing, by the at least one processor and via the abnormality simulator proxy, the plurality of simulated scenarios for each application of the plurality of applications identified for analysis further includes executing one or more potential resolutions for abnormalities detected in the simulated scenarios.

15. The method of claim 14, wherein capturing, by the at least one processor and based on execution of the plurality of simulated scenarios for each application of the plurality of applications identified for analysis, abnormality results for each application further includes capturing, by the at least one processor, a resolution, of the one or more potential resolutions, that resolved the abnormalities detected in the simulated scenarios.

16. The method of claim 15, wherein storing, in the database, the plurality of simulated scenarios and the captured abnormality results for each application further includes storing the resolution that resolved the abnormalities detected in the simulated scenarios.

17. The method of claim 16, wherein evaluating, by the at least one processor and based on the identified abnormality in the deployed version of the application and via the abnormality solver, the identified abnormality to determine whether it can be resolved automatically includes determining whether a stored resolution exists for the identified abnormality.

18. The method of claim 17, wherein responsive to determining that the identified abnormality can be resolved automatically, executing, by the at least one processor, the one or more commands to modify the deployed version of the application to resolve the identified abnormality further includes identifying, by the at least one processor, the stored resolution that exists for the identified abnormality and executing, by the at least one processor, the stored resolution that exists for the identified abnormality.

19. One or more non-transitory computer-readable media storing instructions that, when executed by a computing platform comprising at least one processor, memory, and a communication interface, cause the computing platform to:

identify a plurality of applications for analysis;

execute, via an abnormality simulator proxy, a plurality of simulated scenarios for each application of the plurality of applications identified for analysis, wherein executing the plurality of simulated scenarios for each application includes injecting errors into simulations of each application and observing an impact of the errors on a respective application simulation and applications upstream and downstream from the respective application;

capture, based on execution of the plurality of simulated scenarios for each application of the plurality of applications identified for analysis, abnormality results for each application;

store, in a database, the plurality of simulated scenarios and the captured abnormality results for each application;

compare, via an abnormality analyzer, deployed versions of each application to the plurality of simulated scenarios and the captured abnormality results for a corresponding application to identify an abnormality in a deployed version of an application;

evaluate, based on the identified abnormality in the deployed version of the application and via an abnormality solver, the identified abnormality to determine whether it can be resolved automatically;

responsive to determining that the identified abnormality cannot be resolved automatically:

generate a notification including the identified abnormality in the deployed version of the application and identifying the deployed version of the application;

transmit, to an administrator computing device, the generated notification, wherein transmitting the generated notification causes the administrator computing device to display the notification by a display of the administrator computing device; and responsive to determining that the identified abnormality can be resolved automatically, execute one or more commands to modify the deployed version of the application to resolve the identified abnormality.

20. The one or more non-transitory computer-readable media of claim 19, wherein the identified abnormality includes at least one of: an incorrectly displayed font, an image that does not load properly, or an image having a load time greater than a threshold time.

* * * * *